US012572501B2

(12) United States Patent
Specht

(10) Patent No.: US 12,572,501 B2
(45) Date of Patent: *Mar. 10, 2026

(54) INTEGRATED DIGITAL-ANALOG ARCHIVING SYSTEMS AND METHODS FOR DOCUMENT PRESERVATION

(71) Applicant: OPEN TEXT SA ULC, Halifax (CA)

(72) Inventor: Matthias Specht, Grobenzell (DE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,334

(22) Filed: Aug. 20, 2024

(65) Prior Publication Data

US 2024/0411720 A1 Dec. 12, 2024

Related U.S. Application Data

(63) Continuation of application No. 18/165,584, filed on Feb. 7, 2023, now Pat. No. 12,072,837, which is a continuation of application No. 17/353,672, filed on Jun. 21, 2021, now Pat. No. 11,580,062, which is a continuation of application No. 16/708,103, filed on Dec. 9, 2019, now Pat. No. 11,074,215, which is a continuation of application No. 15/201,903, filed on Jul. 5, 2016, now Pat. No. 10,515,050.

(60) Provisional application No. 62/190,911, filed on Jul. 10, 2015.

(51) Int. Cl.
*G06F 16/11* (2019.01)
*G06F 16/93* (2019.01)

(52) U.S. Cl.
CPC ............ *G06F 16/113* (2019.01); *G06F 16/93* (2019.01)

(58) Field of Classification Search
CPC ............................... G06F 16/93; G06F 16/113
See application file for complete search history.

(56) References Cited

U.S. PATENT DOCUMENTS

| | | | | |
|---|---|---|---|---|
| 7,340,607 | B2 * | 3/2008 | Abhyankar | G06F 21/6209 |
| | | | | 707/999.001 |
| 7,561,310 | B2 * | 7/2009 | Joyce | H04N 1/00326 |
| | | | | 358/1.18 |
| 7,761,427 | B2 * | 7/2010 | Martin | G06Q 10/10 |
| | | | | 707/952 |
| 9,558,204 | B2 * | 1/2017 | Leong | G06F 16/168 |

(Continued)

*Primary Examiner* — Kris E Mackes
(74) *Attorney, Agent, or Firm* — Sprinkle IP Law Group

(57) ABSTRACT

An integrated digital-analog archiving system can automatically initiate a migration process to move electronic documents to a media library. For each electronic document, the system may retrieve the electronic document from a digital data storage medium, extract metadata from the electronic document, determine size, orientation, and format of the electronic document, generate indicators for indicating the start and end of the electronic document to be stored on an analog data storage medium, generate an analog document identifier for identifying the electronic document on the analog data storage medium, generate a scaled image of the electronic document based on the size, orientation, and format of the electronic document, generate a text string based at least in part on the extracted metadata, and render the indicators, the analog document identifier, the scaled image of the electronic document, and the text string on the analog data storage medium.

20 Claims, 2 Drawing Sheets

(56) References Cited

U.S. PATENT DOCUMENTS

| | | | | |
|---|---|---|---|---|
| 2006/0045387 A1* | 3/2006 | Quick | ...................... | G06K 7/14 |
| | | | | 341/94 |
| 2006/0158613 A1* | 7/2006 | Fancher | .......... | G06K 19/06037 |
| | | | | 352/26 |
| 2010/0188704 A1* | 7/2010 | Hoarau | ............. | H04N 1/00196 |
| | | | | 358/1.16 |
| 2011/0198394 A1* | 8/2011 | Hammerl | ......... | G06K 19/06037 |
| | | | | 235/375 |

* cited by examiner

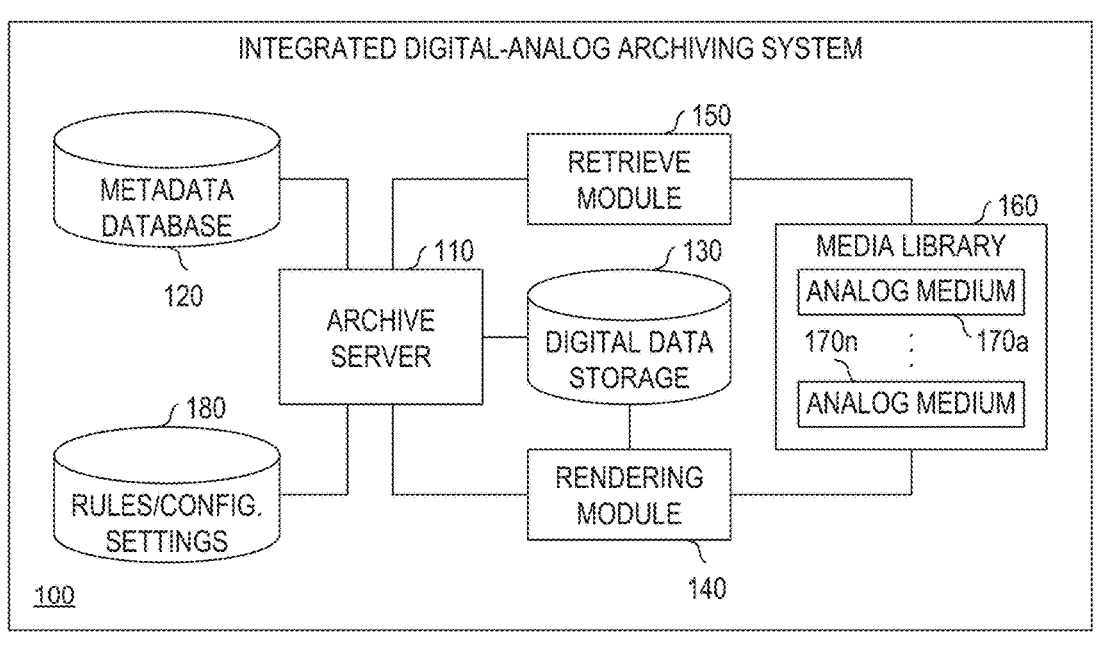

FIGURE 1

INTEGRATED DIGITAL-ANALOG ARCHIVING SYSTEM

METADATA DATABASE
120

RETRIEVE MODULE
150

MEDIA LIBRARY
160
ANALOG MEDIUM
170n : 170a
ANALOG MEDIUM

ARCHIVE SERVER
110

DIGITAL DATA STORAGE
130

RULES/CONFIG. SETTINGS
180

RENDERING MODULE
140

100

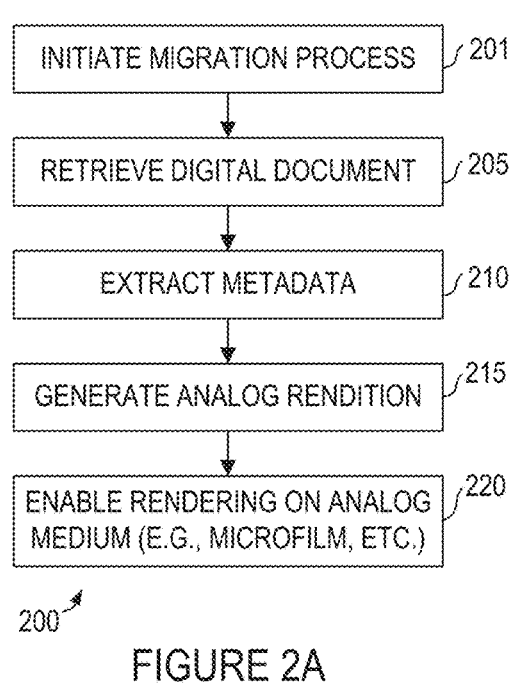

INITIATE MIGRATION PROCESS / 201

RETRIEVE DIGITAL DOCUMENT / 205

EXTRACT METADATA / 210

GENERATE ANALOG RENDITION / 215

ENABLE RENDERING ON ANALOG MEDIUM (E.G., MICROFILM, ETC.) / 220

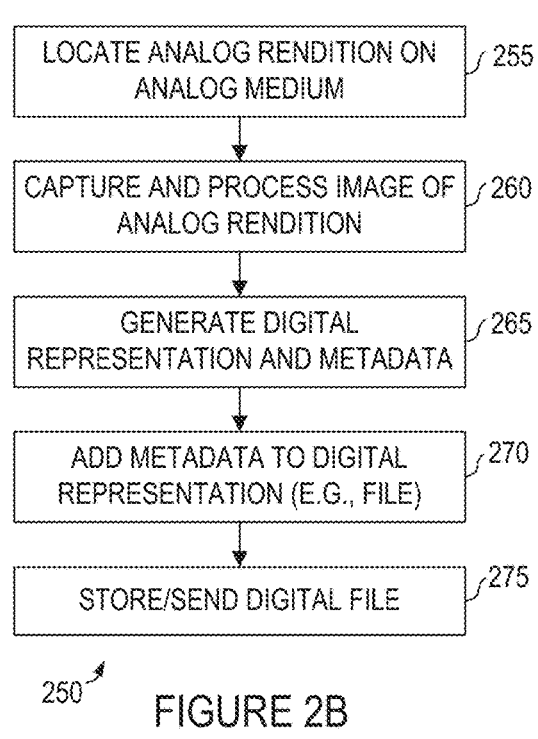

LOCATE ANALOG RENDITION ON ANALOG MEDIUM / 255

CAPTURE AND PROCESS IMAGE OF ANALOG RENDITION / 260

GENERATE DIGITAL REPRESENTATION AND METADATA / 265

ADD METADATA TO DIGITAL REPRESENTATION (E.G., FILE) / 270

STORE/SEND DIGITAL FILE / 275

406   DISPLAY     DATA STORAGE   407

401   CPU     402   I/O     MEMORY   403

400

404   NETWORK INTERFACE     WIRELESS   405

TO NETWORK(S)

INTEGRATED DIGITAL-ANALOG ARCHIVING SYSTEMS AND METHODS FOR DOCUMENT PRESERVATION

CROSS-REFERENCE TO RELATED APPLICATION(S)

This application is a continuation of, and claims a benefit of priority under 35 U.S.C. § 120 from, U.S. patent application Ser. No. 18/165,584, filed Feb. 7, 2023, issued as U.S. Pat. No. 12,072,837, entitled "INTEGRATED DIGITAL-ANALOG ARCHIVING SYSTEMS AND METHODS FOR DOCUMENT PRESERVATION," which is a continuation of, and claims a benefit of priority under 35 U.S.C. § 120 from, U.S. patent application Ser. No. 17/353,672, filed Jun. 21, 2021, issued as U.S. Pat. No. 11,580,062, entitled "INTEGRATED DIGITAL-ANALOG ARCHIVING SYSTEMS AND METHODS FOR DOCU-MENT PRESERVATION," which is a continuation of, and claims a benefit of priority under 35 U.S.C. § 120 from, U.S. patent application Ser. No. 16/708,103, filed Dec. 9, 2019, issued as U.S. Pat. No. 11,074,215, entitled "INTEGRATED DIGITAL-ANALOG ARCHIVING SYSTEMS AND METHODS FOR DOCUMENT PRESERVATION," which is a continuation of, and claims a benefit of priority under 35 U.S.C. § 120 from, U.S. patent application Ser. No. 15/201,903, filed Jul. 5, 2016, issued as U.S. Pat. No. 10,515,050, entitled "INTEGRATED DIGITAL-ANALOG ARCHIVING SYSTEMS AND METHODS FOR DOCU-MENT PRESERVATION," which claims a benefit of priority under 35 U.S.C. § 119 (e) from U.S. Provisional Application No. 62/190,911, filed Jul. 10, 2015, entitled "INTEGRATED DIGITAL-ANALOG ARCHIVING SYS-TEMS AND METHODS FOR DOCUMENT PRESERVA-TION," all of which are hereby fully incorporated by reference herein.

TECHNICAL FIELD

This disclosure relates generally to document management. More particularly, embodiments disclosed herein relate to integrated digital-analog archiving systems, methods, and computer program products for long-term content archiving and preservation, useful for preserving electronic documents on analog media, such as microfilms.

BACKGROUND OF THE RELATED ART

There are many types of archives. Some may exist for historical purposes. For example, over the course of an individual or organization's lifetime, documents may be kept to show a historical view of that person or organization. Some may be put in place by corporations or enterprises alike for compliance reasons. For example, in the United States, an employer is required to preserve for at least three years payroll records, collective bargaining agreements, sales and purchase records, etc.; the Internal Revenue Service requires all records of employment taxes be kept for at least four years; and the Health Insurance Portability and Accountability Act of 1996 (HIPAA) requires a 6-year retention period for protected health information (PHI) such as patients' medical records and other personal health information. Certain types of information, e.g., DNA work product, may be required to be preserved for even longer lengths of time, e.g., 99 years or more.

Whatever the reason is for preserving such documents, they are traditionally assessed, collected, organized, and preserved by information professionals called archivists.

The traditional document preservation process may entail reducing documents deemed worthy of long-term preservation and printing them onto microforms. Microforms can be films or paper that contain microreproductions (e.g., using microphotography or any suitable standard reproduction techniques known to those skilled in the art) of documents. Microform images are commonly reduced to about one twenty-fifth of the original document size. For special purposes, greater optical reductions may be used.

Microforms can have different physical formats. For instance, microform images can be printed on microfilm (mounted on reels) or microfiche (flat sheets). The term "film" generally refers to a thin translucent strip or sheet of cellulose coated with a light-sensitive emulsion, used in a camera to take still pictures or photographs. The term "microfilm" generally refers to a film suitable for bearing a miniature photographic copy or a miniaturized reproduction of printed or other graphic matter, usually of a document, newspaper, or book pages, etc., made for a library, archive, or the like. The term "microfiche" generally refers to a flat sheet of microfilm in a form suitable for filing printed or graphic matter, typically measuring 4 by 6 inches, and containing microreproductions, in a grid pattern. These archival media can be cataloged and stored in archival facilities. Archivists may maintain control over and provide access to the archival media.

A document that has been through this traditional document preservation (analog archiving) process has a physical representation (e.g., on a piece of film) that has a measurable physical quality (e.g., the piece of film is 4 by 6 inches). The digital document preservation (digital archiving) process commonly used in today's electronic environments is entirely different from the analog archiving process described above.

In practice, a digital archiving process can be viewed as a records management process that ensures the protection, maintenance, and accessibility of certain documents and that begins from the moment a document is created and ends with the document being destroyed or preserved. To this end, a records management system is usually responsible for maintaining information on the creation and management of electronic archives in accordance with applicable regulations, policies, rules, and/or laws. Such a records management system can be an essential part of a content management system, because certain managed content may need to be preserved for compliance reasons, as discussed above.

A digital archiving system such as a records management system described above may have many components, including software tools for creating and classifying records, software tools for managing security and confidentiality policies applicable to the records, and long-term storage media for storing the records electronically. However, when compared with the long-term storage media used in an analog archiving system (e.g., microfilms), the long-term storage media used in a digital archiving system (e.g., optical discs, hard drives, tapes, etc., collectively referred to as digital data storage media) have a significantly shorter lifespan. For example, with appropriate storage conditions, preservation standard microfilms have a life expectancy of 500 years. By contrast, digital data storage media generally have a practical life expectancy between 2 to 5 years and published life expectancies of 10, 25, and up to 30 years. As such, relative to an analog archiving system, a digital archiving system may need to move a huge amount of data very frequently.

Another issue relates to the cost of keeping digital data storage media up to date. Each time when an old digital archiving system becomes out of date (e.g., system obsolete) and/or when an old digital data storage medium expires (e.g., software obsolete, format obsolete, or end of life), a massive amount of electronic documents may need to be migrated to a new digital archiving system or a new digital data storage medium. Compared to analog data storage media, digital data storage media can be very expensive and hence the cost of preserving documents on digital data storage media can be very high relative to the cost of preserving documents on analog data storage media.

Yet another issue relates to the need to verify and ensure that each document (in the massive amount of documents that need to be migrated) has not been modified during migration. Skilled artisans appreciate that migration of a document from one electronic data storage device to another may unavoidably involve data conversion of some sort. Furthermore, certain information such as timestamp may be automatically added to the document. Unlike analog archiving systems, such alterations are usually not visible to and/or not easily discoverable by human users.

An analog archiving system stores an actual image of the original data, so it is easy to view and requires no software to decode the data stored thereon. The archived information cannot be modified and can be read and instantly compre- hensible to those who are literate in the language of the archived information. The only equipment needed is a reader machine with a magnifying glass. This eliminates the issue of obsolescence discussed above.

Analog archiving systems, however, are not without drawbacks. For example, reader machines used to view microforms are often difficult to use, requiring users to carefully wind and rewind until they have arrived at the point where the data they are looking for is stored. There is not an automated way to search and retrieve microforms.

SUMMARY OF THE DISCLOSURE

An object of this disclosure is to provide an integrated digital-analog archiving solution that takes advantages of analog archiving systems as well as digital archiving sys- tems, making it cheaper to store documents for a long time while providing the abilities to verify and search the stored documents.

This and other objects can be achieved through embodi- ments of systems, methods and computer program products disclosed herein. For example, in some embodiments, a method may comprise an integrated digital-analog archiving system initiating a migration process to move a large volume of electronic documents from at least one digital (non- transitory) data storage medium to analog data storage media such as microforms or, particularly, microfilms.

In some embodiments, the migration process may be performed by a rendering module of the integrated digital- analog archiving system. The render module may, for each document to be migrated, retrieve the document from a digital data storage medium, extract metadata, determine size, orientation, and format of the document, generate a first indicator for indicating the start of the document on a microfilm, generate a document identifier for identifying the document on the microfilm, generate a scaled (e.g., reduced) image of the document for the microfilm based on the size, orientation, and format of the document, generate technical text based on the metadata extracted from the document, generate a second indicator for indicating the end of the document on the microfilm, and render (e.g., translate or convert them for printing) the indicators, the document identifier, the scaled image of the document, and the tech- nical information on the microfilm.

In some embodiments, the integrated digital-analog archiving system may further include a retrieve module that is coupled to a media library where the microfilm is stored. The integrated digital-analog archiving system may main- tain the identifier of the microfilm, the metadata extracted from the document, and positional information about the document. In some embodiments, responsive to a request to view the document, the retrieve module can locate the correct microfilm on which the document is stored, find the position number associated with the document, capture an image (e.g., utilizing a camera or scanner) of the microfilm at the position number, process the image, and determine whether the image correctly reflects the requested document. If the image is not correct, the retrieve module can reposition the microfilm by, for instance, moving the microfilm for- ward or backward, capture another image of the microfilm, and again process the image and determine whether the image correctly reflects the requested document. This pro- cess can be repeated until the correct image is found. Then, the retrieve module can take a final image which includes the document and the technical information (which is located proximate the document on the microfilm). The retrieve module processes the final image to generate an electronic file in the appropriate digital format and processes the technical information located proximate the document on the microfilm to generate metadata for the electronic file, and return the electronic file with the metadata to service the request.

One embodiment comprises a system comprising a pro- cessor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

These, and other, aspects of the disclosure will be better appreciated and understood when considered in conjunction with the following description and the accompanying draw- ings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrange- ments.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 1 depicts a diagrammatic representation of an example of an integrated digital-analog archiving system according to some embodiments.

FIG. 2A is a flow chart illustrating an example of a rendering method for integrated digital-analog archiving according to some embodiments.

FIG. 2B is a flow chart illustrating an example of a retrieval method for integrated digital-analog archiving according to some embodiments.

DETAILED DESCRIPTION

Figure 3A:
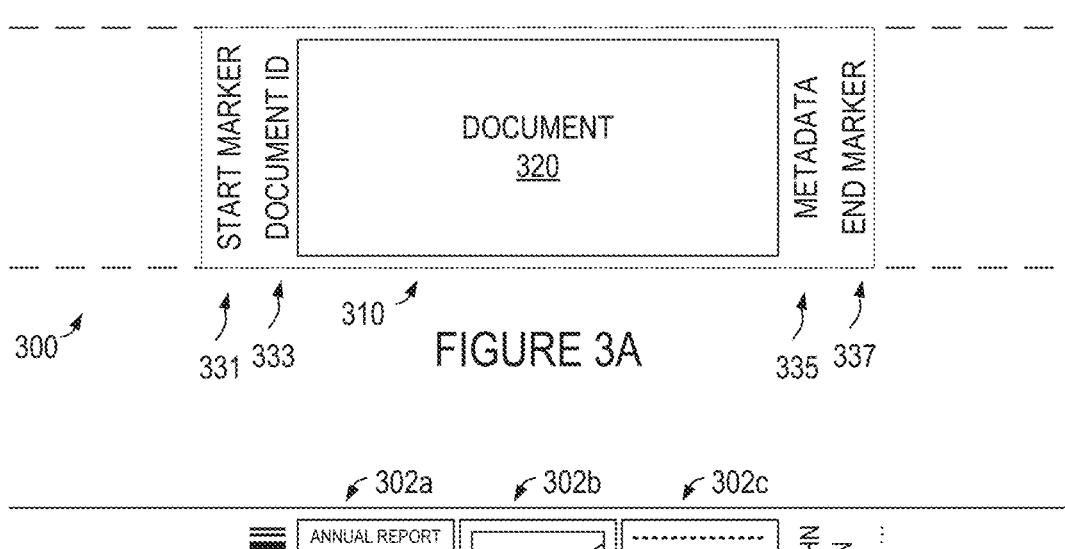
FIG. 3A depicts a diagrammatic representation of an example of an analog rendition format provided by an integrated digital-analog archiving system according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Today, data are commonly stored on digital data storage media. Examples of digital data storage media may include, but are not limited to, erasable non-volatile memory (e.g., erasable at the block-level such as flash memory, erasable at the bye-level such as electrically erasable programmable read-only memory (EEPROM), Solid-State Disk or Drive (SSD), etc.), hard disks, optically readable storage media such as Digital Versatile Discs (DVDs), Blue-ray Disks (BDs), etc.), and magnetic tape data storage media.

Digital data storage media are great for fast access. However, they can be very expensive when used to archive and store data that are not frequently or almost never accessed. As discussed above, an issue for data which are stored for compliance reasons is that the digital data storage system must be replaced relatively frequently, typically after 5 years. That is, all the documents stored in the digital data storage system must be migrated to another digital data storage system at least every 5 years. During the migration, it is essential to keep the information on when the document was archived (e.g., a digital timestamp) and to verify that the document is not modified during this migration process. This is a very costly and time-consuming process.

In an ideal archiving solution, a document would be archived into a non-transitory data storage where the document could be kept for a very long time. With such a long-term solution, migration is only needed as dictated by the limitations of the hardware used. The storage (and document format) of this ideal archiving solution would fulfill the following requirements:

Long term (e.g., 100 years or more) readable

Not modifiable

Compliant (verify when the document was archived and that it is unmodified)

Easy/fast accessible

Unfortunately, such an ideal archiving solution does not exist today. This is because it is impossible to fulfill all these requirements with the currently available data storage technologies which mainly focus on being compliant and increasing access speed. For data which are used during the normal business processes, current data storage technologies are sufficient. However, for archival data which are only rarely or never accessed, a new archiving solution that focuses on long-term readability and compliant is needed.

Compared to digital archives, analog archives (e.g., paper, microforms such as microfilms, etc.) have more or less the exact inverse of challenges. Analog archives can store documents for a very long time and are secure and readily accessible with basic tools such as a reader machine described above. Thus, on the one hand, analog archives face the following challenges:

Access speed (document must be physically retrieved and provided to the user)

Costs related to physically housing all the documents

Costs related to protecting archived documents against physical damages

On the other hand, digital archives face the following challenges:

With the reduced feature set, most viewers show documents slightly different. Also, a digitally archived document may be shown differently after a long period of time. This may be true even if it can be proved that the digitally archived document has not been modified, the content displayed to the user might be different because it is rendered in a different way.

Digitally archived documents are stored in a binary format which is stored on some kind of electronic storage. As history has shown, the storage types/formats appear and disappear quite frequently. Furthermore, it is very likely that a digital data storage device could not be read after 30 years, because the technology very likely would have disappeared by then. Thus, although some digital data storage media types are certified for up to 100 years, it is very unlikely that a device that could read the digital media will still be available and/or operational after such a long period of time.

These and other issues known to those skilled in the art makes it impossible to store digital data for a long period of time without having to continuously migrate and verify the data. Furthermore, the aforementioned rendering issue makes data verification a very complex problem—no existing automated process can detect data modifications and humans are not very good at identifying small modifications. However, the ability to detect and identify modifications, even the smallest modifications, in archived documents can be crucially important in some cases (e.g., to authenticate a historically important document such as a contract, a treaty, a certificate, a letter, etc.).

Embodiments disclosed herein provide an integrated digital-analog archiving solution that combines analog documents with digital archives, taking advantages from both the digital world and the analog world of archiving. As discussed above, classical (analog) archives have proven that storing documents on analog media such as microfilms can be an excellent solution for storing documents for a very long time (e.g., proven long-term data storage for at least 500 years without migration) and accessing it without special hardware. To leverage the longevity of analog data storage media, documents in digital archives are processed and stored on analog data storage media such as microfilms. As explained further below, embodiments are operable to process a digital document, generate an analog document on an analog medium (i.e., an analog rendition of the digital document), and mark the analog document on the analog medium so that it is automatically retrievable. When requested, embodiments can automatically retrieve the analog document and process it back to a digital form such that it is visible in a digital archive.

Currently, digital documents are only stored in computer-readable formats, as those skilled in the art can appreciate. For example, a human cannot pick up a flash memory drive and read a document stored on the flash memory drive without using a computer or the like to read, interpret, and render the stored document on a screen or display device. However, documents stored on the analog data storage media are in a human-readable format and can be viewed in many ways, with or without a computer.

For the purpose of illustration, FIG. 1 depicts a diagrammatic representation of an example of an integrated digital-analog archiving system according to some embodiments. In this example, integrated digital-analog archiving system 100 comprises archive server 110 and metadata database 120 and digital data storage 130 communicatively connected to archive server 110.

These components may be embodied on one or more server machines and configured to perform functions typical of digital archives. For example, archive server 110 may comprise software and hardware necessary to create and/or manage digital data such as electronic records and documents for archival purposes. Metadata about such digital data may be stored in metadata database 120 which, in some embodiments, may implement a relational database management system (RDBMS).

The digital data may be stored in digital data storage 130. Digital data storage 130 may be communicatively connected to archive server 110 in many ways, including over a private network and/or a public network, so long as archive server 110 can access digital data storage 130 to retrieve digital documents for processing. Digital data storage 130 can, but does not need to, physically reside at the same location as archive server 110. In some embodiments, digital data storage 130 can comprise an online or cloud storage server that is external to or remote from integrated digital-analog archiving system 100. In some embodiments, digital data storage 130 can comprise a data source that is local to archive server 110 of integrated digital-analog archiving system 100.

Unlike conventional digital archives, integrated digital-analog archiving system 100 further includes media library 160 having a plurality of analog data storage media 170a . . . 170n. Examples of an analog data storage medium may include, but are not limited to, a film, microfilm, microfiche, or paper. Other types of analog data storage media suitable for long-term content archiving and preservation may also be included.

As illustrated in FIG. 1, media library 160 may be communicatively connected to rendering module 140 and retrieve module 150. In some embodiments, rendering module 140 and retrieve module 150 may be implemented as special functions (e.g., a digital-to-analog rendering function and an analog-to-digital retrieval function) of archive server 110. For example, archive server 110 may initiate a migration process to move documents from digital data storage 130 to media library 160 and, in doing so, process the documents into analog forms and store them on analog media. In response to a request from a client device to view an archived document, archive server 110 may operate to locate an analog rendition archived on an analog medium and convert the analog rendition back to an electronic form for display on the client device.

In some embodiments, rendering module 140 and retrieve module 150 may be implemented as self-contained units that can be called upon by archive server 110 when needed. For example, archive server 110 may operate to call rendering module 140 to perform a digital-to-analog rendering function and may operate to call retrieve module 150 to perform an analog-to-digital retrieval function. The functionality of rendering module 140 and retrieve module 150 will be explained further below with reference to FIGS. 2A and 2B.

In some embodiments, rendering module 140 is particularly programmed to create an analog rendition of a digital document. In this disclosure, an analog rendition of a digital document refers to a physical representation of the digital document in a human-readable format. This physical representation can have an observable and/or measurable physical quality relative to the underlying analog data storage medium which stores the analog rendition. For example, an original document size of a page in a document is 8.5"×11" (or 215.9 mm×279.4 mm). A physical representation of the page can be ½s of the original document size so as to fit the page on a roll of film that has a width of 16 mm. Different optical reductions may be utilized for different original document sizes and/or purposes. Such a physical representation can be rendered, printed, or otherwise outputted on an analog data storage medium utilizing standard technologies (e.g., via a microfilm printer known to those skilled in the art).

In some embodiments, retrieve module 150 may be locally coupled to media library 160 and can communicate with a media robot of media library 160 to load and read analog data storage media 170a . . . 170n. Media library 160 may have a collection of one or more types of analog data storage media such as photographic films/paper, microfilms, microfiche, and/or other archiving media. Skilled artisans appreciate that media library 160 may include other types of physical, non-transitory archiving media, such as tape, glass discs, etc.

Method 200 shown in FIG. 2A illustrates an example of a rendering method for integrated digital-analog archiving according to some embodiments. Method 200 may be carried out by integrated digital-analog archiving system 100 shown in FIG. 1. For example, archive server 110 may initiate a migration process to move a set of electronic documents from digital data storage 130 to media library 160 (step 201). In some embodiments, the migration process may be initiated automatically by archive server 110 responsive to a trigger or on-demand such as per an administrative instruction from an authorized user.

Examples of triggers that may automatically initiate a migration process may include a predetermined condition, a predetermined criterion, a rule, a policy, a predetermined time interval, a scheduled time, or any archiving configuration setting that has been particularly programmed into integrated digital-analog archiving system 100. For example, a policy may dictate that all documents in a particular format should be preserved; a content management system may specify that all documents in a particular volume managed by the content management system should be preserved; a new compliance regulation requires that all patent documents be preserved for 99 years; etc. Archiving rules/configuration settings reflecting or otherwise implementing such requirements may be stored in data store 180 accessible by archive server 110. Those skilled in the art appreciate that such a migration process may involve a huge amount of data (e.g., hundreds of gigabytes of data, if not more).

Data migration generally refers the process of transferring data between storage types, formats, or computer systems. Data migration is usually performed programmatically to achieve an automated migration, freeing up human resources from tedious tasks. A programmatic data migration process may include data extraction and data loading. In this disclosure, data extraction refers to an operation in which data is read from a digital data storage and data loading refers to another operation in which data is written onto an analog medium.

In performing the data extraction, rendering module 140 may, for each document to be migrated, read the document from a digital data storage medium (step 205) and extract metadata from the document (step 210). The specific metadata extracted by rendering module 140 may depend on document type. As a non-limiting example, a document type for a document typically stored in digital data storage 130 may have the following properties:

Change Token
Checkin Comment
File Name
Stream Id
Content Length
Mime Type
Created By
Creation Date
Description
Immutable
Is Latest Major Version
Is Latest Version
Is Major Version
Private Working Copy
Checked Out
Modification Date
Modified By
Name
Object Id
Type-Id
Secondary Type Ids
Version Label
Checked Out By
Checked Out Id
Version Series Id
Archive Server Document Checksum
Archive Server Document Component Name
Datasource Id
Archive Server Document Identifier
Tags Other document properties may also be possible. In some cases, these properties are referred to as keys and together with their values are referred to as key-value pairs (e.g., "Created By: John Doe"; "Creation Date: 06182015"; etc.). Rendering module 140 may be configured to extract particular key-value pairs and store/update same in metadata database 120. The extracted key-value pairs can be used to generate a text string of metadata, as explained below. Example keys may include, but are not limited to, document properties, related dates, related people, related documents, etc. Examples of document properties may include document size, pages, words, total editing time, title, tags, comments, template, category, subject, hyperlink base, company, etc. Examples of related dates may include the last modified date, the creation date, the last printed date, etc. Examples of related people may include a manager, an author, a user who last modified the document, etc. Examples of related documents may include files stored in the same folder or directory with the document, etc. An example text string is shown in FIG. 3B.

In performing the data loading, rendering module 140 may generate an analog rendition of the document read from the digital data storage medium (step 215). In some embodiments, this may entail rendering module 140 determining (which, in one embodiment, can be an optional step) the size, orientation, and format of the document, generating a first indicator (e.g., a start marker, or any suitable visual or optical sign or pattern that is visible to, or that can be read by, humans and/or machines such as a camera, a reader, or a scanner) for indicating the start of the document on a microfilm, generating an analog document identifier (e.g., a bar code, in one embodiment) for identifying the document on the microfilm, generating a scaled (e.g., reduced) image of the document for the microfilm based on the size, orientation, and format of the document, generating technical information/metadata (e.g., an ASCII text string) based on the key-value pairs extracted from the document, and generating a second indicator (e.g., an end marker) for indicating the end of the document on the microfilm.

The scaled image can be generated using standard image processing techniques known to those skilled in the art. The analog rendition (which, in on embodiment, includes the first indicator, the analog document identifier, the scaled image of the document, the text string, and the second indicator) is then outputted to a device (e.g., to a microfilm printer, not shown) communicatively connected to integrated digital-analog archiving system 100 (step 220). The device may then print the analog rendition on an analog medium suitable for long-term storage.

The process described above (e.g., steps 205-220) can be repeated until all documents in the set of electronic documents are migrated to media library 160 or until rendering module 140 is instructed to end, terminate, or stop the process.

As discussed above, in some cases (e.g., for compliance reasons), digital documents must be rendered the same as they would be shown to a user and as printed on analog media such as microfilms. Thus, in some embodiments, rendering module 140 is certified so that it is proven that an analog rendition of a digital document generated by rendering module 140 is identical to the digital document which would be shown to a user.

Accordingly, in some embodiments, rendering module 140 (or a separate function of archive server 110) may, prior to outputting the analog rendition for storage on the analog medium, perform data verification to ensure that the digital data was accurately transformed into the analog form. Digital timestamps are an essential part to verify when a document was archived. To keep this information with the document, in some embodiments, rendering module 140 may generate or obtain a digital timestamp and add an analog version of the digital timestamp to the text string so as to record a time when the scaled image of the electronic document is stored on the analog data storage medium. In this disclosure, a digital timestamp refers to a sequence of characters or encoded information identifying when a document is archived, usually including the date and time of day as recorded by a computer.

Thus, in some embodiments, in addition to metadata extracted from the electronic document, an analog version of a digital timestamp is added as part of the text string located proximate to the analog rendition of the document on the analog medium. This information serves as proof of authenticity of the document at the particular point in time when the document was printed on the analog medium. As it is not possible to modify/alter the document and the information about the document, including the timestamp, printed on the microfilm, the document that is now stored on the analog medium can be considered to be an unmodified, true and trustworthy representation of the original digital document at the time it was archived.

Accordingly, embodiments disclosed herein can address the need to verify and ensure that each document (in the massive amount of documents that need to be migrated) has not been modified during migration. Since information about the document (but not the document itself) is stored in the metadata database and also printed on the analog medium, the verification process can be as straightforward as comparing the metadata extracted from an analog rendition and the metadata stored in the metadata database. For example, if a user searches the archive server on Jun. 27, 2046 for a document that was last modified by John Doe on Jun. 27, 2016, these criteria would be used by the archive server to search the metadata database and also search the analog library. The archive server would then compare the metadata (e.g., Last Modified By, Last Modified Date, etc.) and verify whether they match. Note that such archive verification may be part of an archive compliance process implemented in compliance with a regulation and/or policy governing the document(s) of interest. For example, an archive compliance process may include adding a timestamp to an analog rendition of a document at migration time and the archive verification may include verifying the timestamp on the analog rendition at retrieval time.

Method 250 shown in FIG. 2B illustrates an example of a retrieval method for integrated digital-analog archiving according to some embodiments. Method 250 may be carried out by integrated digital-analog archiving system 100 shown in FIG. 1. For example, retrieve module 150 of integrated digital-analog archiving system 100 may, responsive to a request from a client device communicatively connected thereto to search and/or review an archived document, operate to locate an analog data storage medium in media library 160 (step 255). This may be done by searching metadata database 120 to determine analog medium 170a, on which an analog rendition of the archived document may be stored. In addition to location information, metadata database 120 may store positional information indicating a position of the archived document (e.g., the fourth document) relative to analog medium 170a. Metadata database 120 may further store an identifier of analog medium 170a, an identifier of the archived document, and metadata about the document. The identifier of the archived document is the same as the document identifier printed with the archived document on analog medium 170a.

Utilizing start markers on analog medium 170a, retrieve module 150 may operate to position (e.g., advance, forward, orient, etc.) analog medium 170a on a viewer or reader to a position/orientation indicated by the positional information retrieved from metadata database 120 for the archived document of interest and capture (e.g., using a camera, scanner, a reader, etc.) an image of analog medium 170a for further processing (step 260). This image can have a particular analog rendition format that enables automatic generation of a digital representation of the archived document by retrieve module 150.

Figure 3B:
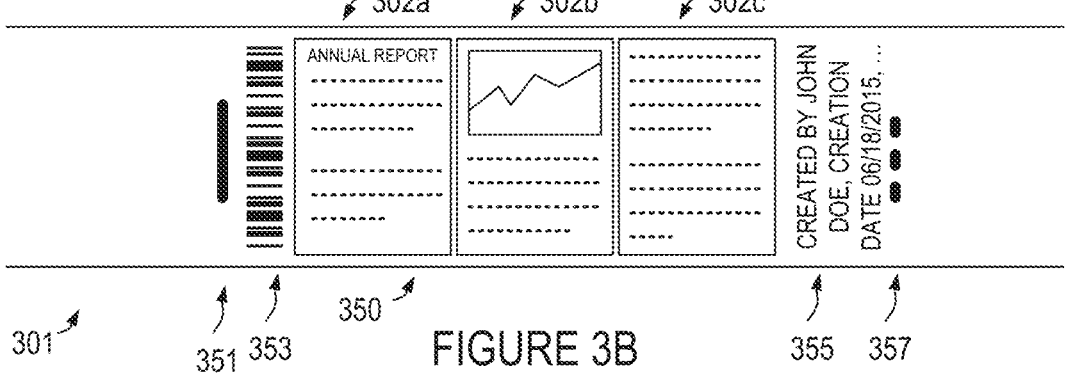
FIG. 3B depicts a diagrammatic representation of an example of a digital document that has been transformed into an analog rendition format and stored on an analog data storage medium according to some embodiments.

FIG. 3A depicts a diagrammatic representation of an example of analog rendition format 300 provided by an integrated digital-analog archiving system according to some embodiments. As illustrated in FIG. 3A, analog rendition format 300 represents a new analog rendition format that may be generated by a rendering module (e.g., rendering module 140 described above with reference to FIGS. 1 and 2). This new analog rendition format makes it possible for a special retrieve module (e.g., retrieve module 150 of FIG. 1) to retrieve analog documents stored on analog data storage media (e.g., analog media 170a . . . 170n of media library 160 shown in FIG. 1) in an automated fashion and yet it remains in a human-readable form and can be read by human users without computer hardware.

As illustrated in FIG. 3A and referring to FIG. 1, analog rendition format 300 may include a first indicator (e.g., start marker 331), an analog document identifier (e.g., document ID 333), a scaled (e.g., reduced) image of a digital document (e.g., document 320), a text string (e.g., metadata 335), and a second indicator (e.g., end marker 337). In this example, analog rendition format 300 is particularly suited for storing analog renditions on analog medium 310.

FIG. 3B depicts a diagrammatic representation of an example of a digital document that has been transformed into analog rendition 301 in analog rendition format 300 and stored on analog data storage medium 350 according to some embodiments. In this example, analog rendition 301 may include a first indicator (e.g., start marker 351), an analog document identifier (e.g., bar code 353), three images (e.g., images 302a, 302b, 302c), a text string (e.g., metadata 355), and a second indicator (e.g., end marker 357).

Here, the first and second indicators are represented as straight lines having different patterns. Those skilled in the art appreciate that other types of indicators and/or patterns may also be used.

In the example of FIG. 3B, the analog document identifier is stored on analog medium 350 as a bar code (e.g., bar code 353). In some embodiments, the analog document identifier is stored both in a barcode format and human-readable format (e.g., text). In some embodiments, archive server 110 may store an electronic version of the document identifier in metadata database 120 and may maintain an identifier of the microfilm, metadata extracted from each document, and positional information about each document, for instance, in metadata database 120. The document identifier, which is stored in metadata database 120 and which is also printed on an analog medium along with the analog rendition of the document, can be used to obtain the archived document from media library 160.

As discussed above, there are many different types of analog data storage media including flat films, microfilms, aperture cards, microfiches, high-density microfiches, high-density microfilms, etc. Depending upon the type of analog data storage media used in media library 160, different positional information and/or different reduction techniques may be utilized. In the example of FIG. 3B, three pages of a digital document are significantly reduced (e.g., scaled to about ½s of their original size) to produce images that fit within a width of analog data storage medium 350.

As a non-limiting example, the standard lengths for roll film are 100 ft., 130 ft., and 215 ft. for 16 mm rolls. A 16 mm microfilm may carry 2,400 images of originally letter-sized pages (8.5"×11" or 215.9 mm×279.4 mm) as a single stream of micro images along the film set so that lines of text in each image are parallel to the sides of the microfilm. Accordingly, a position number #111 may indicate that the document begins at the 111$^{th}$ position (e.g., the 111$^{th}$ image of the 2,400 images) on the microfilm. As describe above, as an optional feature, the document may be sized and oriented appropriately by rendering module 140 so as to fit the document on the microfilm.

In some embodiments, a microfilm is printed sequentially with analog renditions of documents and associated metadata in human-readable form (e.g., images and texts). For example, following the above example key-value pairs such as "Created By: John Doe" and "Creation Date: 06182015"; etc., metadata 355 may comprise a text string of "CREATED BY JOHN DOE, CREATION DATE Jun. 18, 2015, . . ." located proximate (e.g., before or after) the first or last image (e.g., before image 302*a* or after 302*c*, in the example of FIG. 3B). Those skilled in the art appreciate that metadata 355 may be located anywhere between start marker 351 and end marker 357 of analog rendition 301 and thus is not limited to the example shown in FIG. 3B. Furthermore, metadata 355 associated with the document may be located in multiple places on analog medium 350 between start marker 351 and end marker 357 of analog rendition 301. For example, a timestamp may be located on analog medium 350 separate from the metadata originally extracted from the electronic document during the data extraction operation.

Referring to FIG. 1 and FIG. 2B, in some embodiments, retrieve module 150 is particularly configured for retrieving analog documents archived in the new analog rendition format described above. As discussed above, in some embodiments, responsive to a request received at archive server 110 to view an archived document, retrieve module 150 can locate an analog data storage medium in the media library, locate an analog rendition on the analog data storage medium, capture an image of the analog rendition, process the image of the analog rendition, and determine whether the image correctly reflects a requested document (steps 255-260). If the image does not correctly reflect the requested document, retrieve module 150 may reposition the analog data storage medium and repeating the capturing, the processing, and the determining until a correct image that reflects the requested document is found, or until this process is terminated, for instance, due to an error condition or an administrative instruction. If the image correctly reflects the requested document, retrieve module 150 may capture or process a final image of the analog rendition.

Utilizing the analog rendition format described above, retrieve module 150 may obtain an analog document and analog metadata located proximate the analog document on the analog data storage medium and generate a digital representation (e.g., an electronic file) from the analog document along with electronic metadata from the analog metadata (step 265). Retrieve module 150 may add the electronic metadata to the electronic file (step 270) and return the electronic file so that archive server 110 can service the request and/or store the electronic file (step 275).

More specifically, in some embodiments, to locate the correct analog medium in media library 160 on which a requested document is stored, retrieve module 150 may utilize the microfilm identifier associated with the document identifier in metadata database 120 maintained by archive server 110. In some embodiments, retrieve module 150 may then utilize the position number to locate the document on the analog medium. This may entail retrieve module 150 detecting the start marker of the requested document indicated by the position number. Once at the position indicated by the position number, retrieve module 150 may operate a camera, a scanner, or a reader to capture an image of the microfilm at the position indicated by the position number. Retrieve module 150 may process the captured image (e.g., an image file in a raw data format) and determine whether the image correctly reflects the requested document.

If the image thus processed by retrieve module 150 does not correspond to the requested document (e.g., the image shows a single page document as opposed to a three-pages document, a portion of the image is not readable by retrieve module 150, etc.), retrieve module 150 can move the microfilm sequentially forward or backward, capture another image of the microfilm, and again interpret and determine whether the image correctly reflects the requested document. In some embodiments, retrieve module 150 may include hardware components such as a microfilm reader, a light source, and a camera. Features of a microfilm reader may include a lens capable of magnifying the image on a film to at least the size of the original document and a film loader for holding the film under examination in position under the lens as illuminated by the light source. As an example, the lens of the microfilm reader may be integrated with a camera. Moving the microfilm can be accomplished by retrieve module 150 moving a microfilm reader or a platform on which the microfilm is loaded.

The process described above can be repeated until a correct image is found and a final image is captured. As described above, according to the new analog rendition format, such a final image would include the document and the technical information (in a text string) associated therewith. As a non-limiting example, the text string may sequentially follow or otherwise located proximate to the analog image of the requested document on the microfilm, as illustrated in FIGS. 3A and 3B. Retrieve module 150 can then convert the analog image back to an electronic file in an appropriate digital format (i.e., a digital machine-readable rendition which, in one embodiment, can be in the Tagged Image File Format (TIFF) format). Metadata associated with the requested document, which may include the digital timestamp from the initial ingestion (e.g., during the migration process), may be converted from the text string stored on the microfilm and/or retrieved from metadata database 120. Retrieve module 150 may then return the electronic file, with the associated metadata already added, to archive server 110 which, in turn, may communicate the electronic file to a client device for display on the client device. The metadata may or may not be shown on the client device.

An important feature of embodiments disclosed herein is that a document stored on an analog medium could still be viewed without the retrieve module described above. Without the retrieve module, a document stored on an analog medium could not be retrieved for viewing in an automated retrieval process. However, with the currently available technology to view microfilms, the documents could still be retrieved and viewed using a conventional microfilm reader.

Embodiments disclosed herein can provide many advantages. For example, the integrated digital-analog archiving system disclosed herein can support microfilms as an additional storage tier, allowing management of digital and analog content in a single system (e.g., a single entry point to review archived documents whether they are in digital or analog form). Furthermore, the integration of analog long-term human-readable media provides additional advantages such as making it impossible to modify the archived documents, allowing the archived documents to be preserved for a long, extended period of time (e.g., 100-500 years), possibly requiring no media change over the life of the documents, and enabling the archived documents to be stored in a secure physical environment (which is not possible to be hacked via a computer network). The integration of digital archives with analog documents allows the analog documents to be easily accessible and searchable with standard search functionality. Additionally, with the retrieve module described above, the retrieval process may be automated, eliminating the need for an archivist to physically retrieve an analog document from an analog archive.

Figure 4:
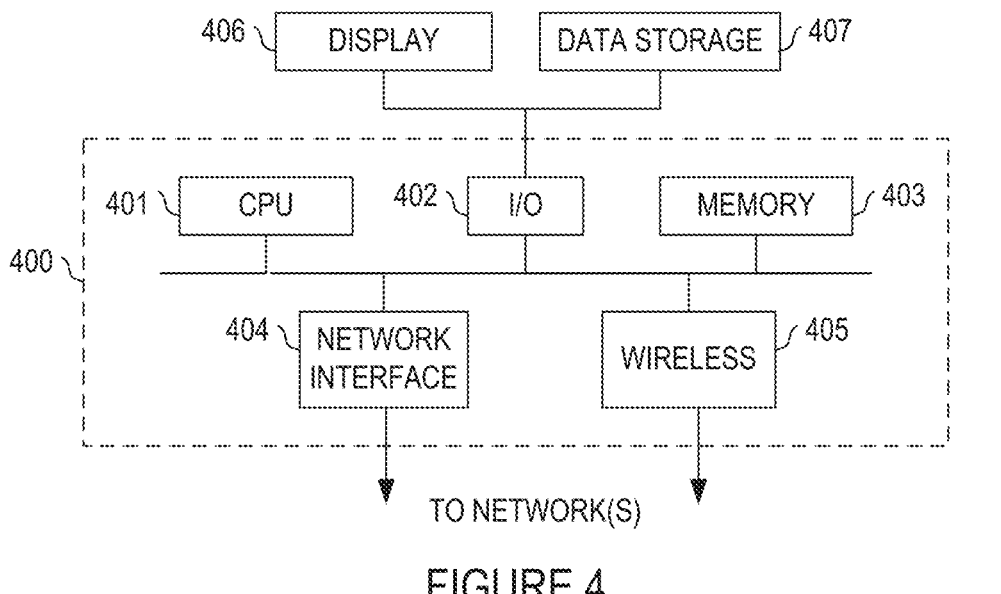
FIG. 4 depicts a diagrammatic representation of one example embodiment of a data processing system that can be used to implement embodiments disclosed herein.

FIG. 4 depicts a diagrammatic representation of one example embodiment of a data processing system that can be used to implement embodiments disclosed herein. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, information device 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more purpose digital computers, by using application specific integrated circuits, programmable logic devices, field programmable gate arrays, optical, chemical, biological, quantum or nano-engineered systems, components and mechanisms may be used. In general, the functions of the invention can be achieved in many ways. For example, distributed, or net-worked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The com-puter readable medium can be, by way of example only but not by limitation, an electronic, magnetic, optical, electro-magnetic, infrared, or semiconductor system, apparatus, system, device, propagation medium, or computer memory. Such computer-readable medium shall generally be machine readable and include software programming or code that can be human-readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appro-priate computer memories and data storage devices. In an illustrative embodiment, some or all of the software com-ponents may reside on a single server computer or on any combination of separate server computers. As one skilled in the art can appreciate, a computer program product imple-menting an embodiment disclosed herein may comprise one or more non-transitory computer readable media storing computer instructions translatable by one or more processors in a computing environment.

A "processor" includes any, hardware system, mechanism or component that processes data, signals or other informa-tion. A processor can include a system with a central processing unit, multiple processing units, dedicated cir-cuitry for achieving functionality, or other systems. Process-ing need not be limited to a geographic location, or have temporal limitations. For example, a processor can perform its functions in "real-time," "offline," in a "batch mode," etc. Portions of processing can be performed at different times and at different locations, by different (or the same) pro-cessing systems.

As used herein, the terms "comprises," "comprising," "includes," "including," "has," "having," or any other varia-tion thereof, are intended to cover a non-exclusive inclusion. For example, a process, product, article, or apparatus that comprises a list of elements is not necessarily limited only those elements but may include other elements not expressly listed or inherent to such product, process, article, or appa-ratus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise spe-cifically noted. The scope of the disclosure should be determined by the following claims and their legal equiva-lents.

What is claimed is:

1. A system for integrated digital-analog archiving, the system comprising:

an archiver server having a processor, a non-transitory computer-readable medium, and instructions stored on the non-transitory computer-readable medium and translatable by the processor for:

receiving a request for a document stored on an analog archiving medium, the request containing search criteria;

retrieving, from a metadata database based on the search criteria, positional information of an analog rendition of the document;

determining, utilizing the positional information, a position of the analog rendition of the document on the analog archiving medium;

capturing an image of the analog rendition of the document at the position;

determining whether the image correctly reflects the document;

responsive to the image not correctly reflecting the document, positioning the analog archiving medium and repeating the capturing and the determining until a correct image that reflects the document is found;

capturing a final image of the analog rendition of the document, the final image including a scaled image of the analog rendition of the document and analog metadata located proximate the scaled image on the analog archiving medium;

processing the final image of the analog rendition of the document, the processing including:

transforming the scaled image of the analog rendi-tion of the document into an electronic file; and transforming the analog metadata into electronic metadata;

adding the electronic metadata to the electronic file; and returning the electronic file in response to the request.

2. The system of claim 1, wherein the instructions are further translatable by the processor for:

verifying whether the document has been modified during migration from a data storage to the analog archiving medium by comparing a timestamp printed at migration time as part of the analog metadata located proximate the scaled image on the analog archiving medium with a last modified timestamp stored in the metadata data-base, the last modified timestamp indicating a time that the document was last modified.

3. The system of claim 1, wherein the instructions are further translatable by the processor for archiving the document on the analog archiving medium, the archiving comprising:

retrieving an electronic version of the document from a data storage;

extracting metadata from the electronic version of the document;

generating a text string based at least in part on the metadata extracted from the electronic version of the document;

determining size, orientation, and format of the electronic version of the document;

generating a scaled image of the electronic version of the document based on the size, orientation, and format of the electronic version of the document;

generating an analog document identifier for identifying the scaled image on the analog archiving medium;

generating indicators for indicating a start and an end of the scaled image on the analog archiving medium;

adding an analog version of a digital timestamp to the text string so as to record a time when the scaled image is stored on the analog archiving medium;

generating an analog rendition of the scaled image, the analog rendition including the indicators, the analog document identifier, the scaled image, and the text string; and printing the analog rendition on the analog archiving medium.

4. The system of claim 3, wherein the instructions are further translatable by the processor for storing, in the metadata database, an identifier of the electronic version of the document, the digital timestamp, and the positional information indicating the position of the analog rendition printed on the analog archiving medium.

5. The system of claim 3, further comprising:

a microfilm printer for printing the analog rendition on the analog archiving medium.

6. The system of claim 1, further comprising:

a media library having a media robot for loading and reading analog data storage media, including the analog archiving medium.

7. The system of claim 1, wherein the search criteria comprise at least one of: a last modified by name, a last modified date, a user name, or the identifier.

8. A method for integrated digital-analog archiving, the method comprising:

receiving a request for a document stored on an analog archiving medium, the request containing search criteria, the receiving performed by an archiver server having a processor, a non-transitory computer-readable medium, and instructions stored on the non-transitory computer-readable medium;

retrieving, by the archiver server from a metadata database based on the search criteria, positional information of an analog rendition of the document;

determining, by the archiver server utilizing the positional information, a position of the analog rendition of the document on the analog archiving medium;

capturing, by the archiver server, an image of the analog rendition of the document at the position;

determining, by the archiver server, whether the image correctly reflects the document;

responsive to the image not correctly reflecting the document, positioning the analog archiving medium and repeating the capturing and the determining until a correct image that reflects the document is found;

capturing a final image of the analog rendition of the document, the final image including a scaled image of the analog rendition of the document and analog metadata located proximate the scaled image on the analog archiving medium;

processing, by the archiver server, the final image of the analog rendition of the document, the processing including:

transforming the scaled image of the analog rendition of the document into an electronic file; and transforming the analog metadata into electronic metadata;

adding, by the archiver server, the electronic metadata to the electronic file; and returning, by the archiver server, the electronic file in response to the request.

9. The method according to claim 8, further comprising:

verifying whether the document has been modified during migration from a data storage to the analog archiving medium by comparing a timestamp printed at migration time as part of the analog metadata located proximate the scaled image on the analog archiving medium with a last modified timestamp stored in the metadata database, the last modified timestamp indicating a time that the document was last modified.

10. The method according to claim 8, further comprising:

archiving the document on the analog archiving medium, the archiving comprising:

retrieving an electronic version of the document from a data storage;

extracting metadata from the electronic version of the document;

generating a text string based at least in part on the metadata extracted from the electronic version of the document;

determining size, orientation, and format of the electronic version of the document;

generating a scaled image of the electronic version of the document based on the size, orientation, and format of the electronic version of the document;

generating an analog document identifier for identifying the scaled image on the analog archiving medium;

generating indicators for indicating a start and an end of the scaled image on the analog archiving medium;

adding an analog version of a digital timestamp to the text string so as to record a time when the scaled image is stored on the analog archiving medium;

generating an analog rendition of the scaled image, the analog rendition including the indicators, the analog document identifier, the scaled image, and the text string; and printing the analog rendition on the analog archiving medium.

11. The method according to claim 10, further comprising:

storing, in the metadata database, an identifier of the electronic version of the document, the digital timestamp, and the positional information indicating the position of the analog rendition printed on the analog archiving medium.

12. The method according to claim 10, wherein the printing comprises causing a microfilm printer to perform the printing the analog rendition on the analog archiving medium.

13. The method according to claim 8, wherein the analog archiving medium is part of a media library, the media library having a media robot for loading and reading analog data storage media, including the analog archiving medium.

14. The method according to claim 8, wherein the search criteria comprise at least one of: a last modified by name, a last modified date, a user name, or the identifier.

15. A computer program product for integrated digital-analog archiving, the computer program product comprising a non-transitory computer-readable medium storing instructions translatable by a processor of an archiver server for:

receiving a request for a document stored on an analog archiving medium, the request containing search criteria;

retrieving, from a metadata database based on the search criteria, positional information of an analog rendition of the document;

determining, utilizing the positional information, a position of the analog rendition of the document on the analog archiving medium;

capturing an image of the analog rendition of the document at the position;

determining whether the image correctly reflects the document;

responsive to the image not correctly reflecting the document, positioning the analog archiving medium and repeating the capturing and the determining until a correct image that reflects the document is found;

capturing a final image of the analog rendition of the document, the final image including a scaled image of the analog rendition of the document and analog metadata located proximate the scaled image on the analog archiving medium;

processing the final image of the analog rendition of the document, the processing including:

transforming the scaled image of the analog rendition of the document into an electronic file; and transforming the analog metadata into electronic metadata;

adding the electronic metadata to the electronic file; and returning the electronic file in response to the request.

16. The computer program product of claim 15, wherein the instructions are further translatable by the processor for:

verifying whether the document has been modified during migration from a data storage to the analog archiving medium by comparing a timestamp printed at migration time as part of the analog metadata located proximate the scaled image on the analog archiving medium with a last modified timestamp stored in the metadata database, the last modified timestamp indicating a time that the document was last modified.

17. The computer program product of claim 15, wherein the instructions are further translatable by the processor for archiving the document on the analog archiving medium, the archiving comprising:

retrieving an electronic version of the document from a data storage;

extracting metadata from the electronic version of the document;

generating a text string based at least in part on the metadata extracted from the electronic version of the document;

determining size, orientation, and format of the electronic version of the document;

generating a scaled image of the electronic version of the document based on the size, orientation, and format of the electronic version of the document;

generating an analog document identifier for identifying the scaled image on the analog archiving medium;

generating indicators for indicating a start and an end of the scaled image on the analog archiving medium;

adding an analog version of a digital timestamp to the text string so as to record a time when the scaled image is stored on the analog archiving medium;

generating an analog rendition of the scaled image, the analog rendition including the indicators, the analog document identifier, the scaled image, and the text string; and printing the analog rendition on the analog archiving medium.

18. The computer program product of claim 17, wherein the instructions are further translatable by the processor for storing, in the metadata database, an identifier of the electronic version of the document, the digital timestamp, and the positional information indicating the position of the analog rendition printed on the analog archiving medium.

19. The computer program product of claim 17, wherein the printing comprises causing a microfilm printer to perform the printing the analog rendition on the analog archiving medium.

20. The computer program product of claim 15, wherein the analog archiving medium is part of a media library, the media library having a media robot for loading and reading analog data storage media, including the analog archiving medium.

* * * * *